(12) United States Patent
Fenn et al.

(10) Patent No.: US 9,040,621 B2
(45) Date of Patent: May 26, 2015

(54) AQUEOUS DISPERSIONS OF MICROGEL ENCAPSULATED PARTICLES UTILIZING HYPERBRANCHED ACRYLIC POLYMERS

(71) Applicant: PPG Industries Ohio, Inc., Cleveland, OH (US)

(72) Inventors: David R. Fenn, Allison Park, PA (US); Dennis L. Faler, North Huntingdon, PA (US); Linda Anderson, Allison Park, PA (US); Tety Roper, Valencia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 131 days.

(21) Appl. No.: 13/834,804

(22) Filed: Mar. 15, 2013

(65) Prior Publication Data

US 2014/0275362 A1   Sep. 18, 2014

(51) Int. Cl.
| | | |
|---|---|---|
| *C08K 3/22* | (2006.01) | |
| *C08K 5/3465* | (2006.01) | |
| *C08K 5/3437* | (2006.01) | |
| *C08K 5/3417* | (2006.01) | |
| *C09C 1/36* | (2006.01) | |
| *C09C 1/40* | (2006.01) | |
| *C09C 3/10* | (2006.01) | |
| *C09D 7/12* | (2006.01) | |
| *C09C 1/24* | (2006.01) | |
| *C09C 1/30* | (2006.01) | |
| *C09D 5/02* | (2006.01) | |
| *C08K 9/10* | (2006.01) | |

(52) U.S. Cl.
CPC ............... *C08K 3/22* (2013.01); *C08K 5/3417* (2013.01); *C08K 5/3437* (2013.01); *C08K 5/3465* (2013.01); *C09C 1/3676* (2013.01); *C09C 1/407* (2013.01); *C09C 3/10* (2013.01); *C09D 7/1225* (2013.01); *C09C 1/24* (2013.01); *C09C 1/3072* (2013.01); *C08K 9/10* (2013.01); *C01P 2006/22* (2013.01); *C09D 5/022* (2013.01)

(58) Field of Classification Search
CPC ......... C08L 33/02; C08L 33/08; C08L 33/10; C08L 75/16; C08F 2/44; C08F 292/00; C08F 265/06; C08F 220/06; C08F 220/10; C08F 2810/20; C08F 220/1006; C08F 4/06; C08K 3/0033; C08K 3/22; C08K 3/08; C08K 5/0041; C08K 5/3437; C08K 5/3465; C08K 9/10; C08K 2201/011; C09D 133/02; C09D 133/08; C09D 133/01
USPC ................ 524/88, 556, 560, 430, 431, 94, 90
See application file for complete search history.

(56) References Cited

U.S. PATENT DOCUMENTS

| | | | |
|---|---|---|---|
| 5,853,809 A | 12/1998 | Campbell et al. | |
| 6,646,041 B2 * | 11/2003 | St. John Williams et al. | ............................. 524/522 |
| 7,605,194 B2 | 10/2009 | Ferencz et al. | |
| 8,674,001 B2 * | 3/2014 | Ganapathiappan et al. | .. 523/205 |
| 2009/0036570 A1 * | 2/2009 | Anderson | ..................... 523/403 |
| 2009/0180976 A1 | 7/2009 | Seeney et al. | |
| 2009/0227711 A1 | 9/2009 | Carlini et al. | |

FOREIGN PATENT DOCUMENTS

| | | |
|---|---|---|
| WO | 2010/011677 A1 | 1/2010 |
| WO | WO 2012/082964 | 6/2012 |
| WO | WO 2012/082965 | 6/2012 |

* cited by examiner

*Primary Examiner* — Satya Sastri
(74) *Attorney, Agent, or Firm* — Justin P. Martinchek

(57) ABSTRACT

An aqueous dispersion includes particles at least partially encapsulated in a microgel where the microgel is prepared from a hyperbranched acrylic polymer. In addition, a method for making an aqueous dispersion includes: (1) mixing in an aqueous medium: (a) particles, (b) at least one ethylenically unsaturated monomer, and (c) a water-dispersible hyperbranched acrylic polymer having ethylenic unsaturation; and (2) polymerizing the at least one ethylenically unsaturated monomer and water-dispersible hyperbranched acrylic polymer having ethylenic unsaturation to at least partially encapsulate the particles in a microgel.

20 Claims, No Drawings

AQUEOUS DISPERSIONS OF MICROGEL ENCAPSULATED PARTICLES UTILIZING HYPERBRANCHED ACRYLIC POLYMERS

BACKGROUND OF THE INVENTION

1. Field of the Invention

The present invention relates to aqueous dispersions of microgel encapsulated particles, as well as methods of forming the aqueous dispersions using hyperbranched acrylic compositions.

2. Description of Related Art

Pigment and/or filler particles are used to impart color and/or performance properties in basecoats, powder coatings, and various other applications. However, these particles tend to have a strong affinity for each other and, unless separated, tend to clump together to form agglomerates. Therefore, these agglomerates are often dispersed in an aqueous medium that acts as a grind vehicle to keep the particles separated.

Ideally, a grind vehicle should have positive effects on the physical and rheological properties of coatings. However, conventional acrylic grind vehicles have adverse effects on the rheological properties of waterborne coatings. Further, these pigment dispersions often require heavy agitation to prevent settling, and, when used in paint formulations, these tints exhibit pigment flocculation resulting in stability issues.

It would be desirable to provide an aqueous dispersion that prevents particles from agglomerating and flocculating, and which also provides improved rheological properties in subsequent coating applications.

SUMMARY OF THE INVENTION

The present invention is directed to an aqueous dispersion that includes particles at least partially encapsulated in a microgel, where the microgel includes a hyperbranched acrylic polymer.

In other respects, the present invention is directed to a method for making an aqueous dispersion that includes: (1) mixing in an aqueous medium: (a) particles, (b) at least one ethylenically unsaturated monomer, and (c) a water-dispersible hyperbranched acrylic polymer having ethylenic unsaturation; and (2) polymerizing the at least one ethylenically unsaturated monomer and water-dispersible hyperbranched acrylic polymer having ethylenic unsaturation to at least partially encapsulate the particles in a microgel.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, moieties in a general chemical formula and quantities of ingredients used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the Doctrine of Equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated above, certain embodiments of the present invention are directed to aqueous dispersions. As used herein, the term "dispersion" refers to a two-phase system in which one phase includes finely divided particles distributed throughout a second phase, which is a continuous phase. The dispersions of the present invention often are oil-in-water emulsions, wherein an aqueous medium provides the continuous phase of the dispersion in which the particles are suspended as the organic phase.

As used herein, the term "aqueous", "aqueous phase", "aqueous medium", and the like, refers to a medium that either consists exclusively of water or comprises predominantly water in combination with another material, such as, for example, an inert organic solvent. In certain embodiments, the amount of organic solvent present in the aqueous dispersions of the present invention is less than 20 weight percent, such as less than 10 weight percent, or, in some cases, less than 5 weight percent, or, in yet other cases, less than 2 weight percent, with the weight percents being based on the total weight of the dispersion. Non-limiting examples of suitable organic solvents are propylene glycol monobutyl ether, ethylene glycol monohexyl ether, ethylene glycol monobutyl ether, n-butanol, benzyl alcohol, and mineral spirits.

In certain embodiments, the aqueous dispersion of the present invention includes particles at least partially encapsulated in a microgel. As used herein, the term "microgel" refers to internally crosslinked micro-sized polymer. The term "polymer" is meant to encompass oligomers, and includes without limitation both homopolymers and copolymers. Thus, in certain embodiments, the present invention is directed to an aqueous dispersion that includes a plurality of internally crosslinked micro-sized polymers that are used to at least partially encapsulate particles. As used herein, the term "partially encapsulate" refers to particles that are at least partially confined or enclosed within a microgel to an extent sufficient to physically separate particles from each other within the aqueous dispersion, thereby preventing significant agglomeration of the particles. The microgels of the present invention are sufficiently crosslinked so that the microgels are no longer soluble in a solvent and the encapsulated particles cannot be separated from the internally crosslinked polymers or microgels.

In certain embodiments, the microgel is prepared from a hyperbranched acrylic polymer. As used herein, the term "hyperbranched acrylic polymer" refers to a polymer having a main polymer chain and at least two branching points along the main polymer chain. In certain embodiments, the hyperbranched acrylic polymer includes ethylenic unsaturation. As used herein, the term "ethylenic unsaturation" refers collectively to aliphatic carbon-carbon double bonds and aliphatic carbon-carbon triple bonds.

In certain embodiments, the hyperbranched acrylic polymer having at least one site of ethylenic unsaturation is prepared by reacting an ethylenically unsaturated carboxylic acid and at least one monomer having more than one site of ethylenic unsaturation, i.e., a polyethylenically unsaturated monomer. Non-limiting examples of ethylenically unsaturated carboxylic acids that are suitable for use with the present invention include, but are not limited to, (meth)acrylic acid, beta-carboxyethyl acrylate, acryloxypropionic acid, citraconic acid, crotonic acid, fumaric acid, maleic acid, itaconic acid, and mixtures thereof. As used herein, "(meth)acrylic" and terms derived therefrom are intended to include both acrylic and methacrylic.

Alternatively, in another embodiment, an ethylenically unsaturated acidic anhydride can be used. Non-limiting examples of ethylenically unsaturated acidic anhydrides that are suitable for use with the present invention include, but are not limited to, maleic anhydride and methacrylic anhydride.

As indicated above, in certain embodiments, the ethylenically unsaturated carboxylic acid is reacted with a polyethylenically unsaturated monomer. Polyethylenically unsaturated monomers include, but are not limited to, bifunctional ethylenically unsaturated compounds, which contain two sites of ethylenic unsaturation per molecule, trifunctional ethylenically unsaturated compounds, which contain three sites of ethylenic unsaturation per molecule, tetrafunctional ethylenically unsaturated compounds, which contain four sites of ethylenic unsaturation per molecule, and pentafunctional ethylenically unsaturated compounds, which contain five sites of ethylenic unsaturation per molecule.

Specific non-limiting examples of polyethylenically unsaturated monomers that can be used with the present invention include, but are not limited to, diacrylates, such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate, and/or bisphenol A dimethacrylate; triacrylates, such as trimethylolpropane triacrylate, trimethylolpropane trimethacrylate, pentaerythritol monohydroxy triacrylate, and/or trimethylolpropane triethoxy triacrylate; tetraacrylates, such as pentaerythritol tetraacrylate, and/or di-trimethylolpropane tetraacrylate; and/or pentaacrylates, such as dipentaerythritol (monohydroxy)pentaacrylate.

Other non-limiting examples of polyethylenically unsaturated monomers include, but are not limited to, divinyl benzene, vinyl methacrylate, allyl methacrylate, allyl acrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate, dicyclopentenyl (meth)acrylates, dicyclopentenyloxy (meth) acrylates, and unsaturated esters of glycol monodicyclopentenyl ethers.

In certain embodiments, a free radical initiator can be used to initiate polymerization between the ethylenically unsaturated carboxylic and the polyethylenically unsaturated monomer. Both water and oil soluble initiators can be used including, but not limited to, hydrogen peroxide, t-butyl hydroperoxide, di-t-butyl peroxide, benzoyl peroxide, and di-t-amyl peroxide, butylperoxy-2-ethyl hexanoate, t-butyl peracetate, and 2,2'azobis (2 methylbutyronitrile).

In addition, in some embodiments, the reaction can also include ethylenically unsaturated monomers with only one site of unsaturation, i.e., mono ethylenically unsaturated monomers. Non-limiting examples of monoethylenically unsaturated monomers include, but are not limited to, styrene, α-methylstyrene, vinyl toluene, 4-methylstyrene, tert-butyl-styrene, 2-chlorostyrene, vinylpyridine, vinylpyrrolidone, methyl crotonoate, sodium crotonoate, ethyl acrylate, propyl acrylate, isopropyl acrylate, butyl acrylate, 2-ethylhexyl acrylate, decyl acrylate, hydroxyethyl acrylate, methyl methacrylate, ethyl methacrylate, propyl methacrylate, isopropyl methacrylate, butyl methacrylate, sec-butyl methacrylate, isobutyl methacrylate, n-amyl methacrylate, isoamyl methacrylate, n-hexyl methacrylate, tert-butyl methacrylate, 2-ethylhexyl methacrylate, n-octyl methacrylate, methallyl methacrylate, phenyl methacrylate, benzyl methacrylate, allyl methacrylate, cyclohexyl methacrylate, 2-hydroxyethyl methacrylate, 2-hydroxypropyl methacrylate, N,N-dimethylaminoethyl methacrylate, N,N-diethylamino ethyl methacrylate, tert-butylamino ethyl methacrylate, 2-sulfoethyl methacrylate, trifluoroethyl methacrylate, glycidyl methacrylate, 2-n-butoxyethyl methacrylate, 2-chloroethyl methacrylate, 2-ethylbutyl methacrylate, cinnamyl methacrylate, cyclopentyl methacrylate, 2-ethoxyethyl methacrylate, furfuryl methacrylate, hexafluoroisopropyl methacrylate, 3-methoxybutyl methacrylate, 2-methoxybutyl methacrylate, 2-nitro-2-methylpropyl methacrylate, 2-phenoxyethyl methacrylate, 2-phenylethyl methacrylate, propargyl methacrylate, tetrahydrofurfuryl methacrylate, tetrahydropyranyl methacrylate, methacrylamide, N-methylmethacrylamide, N-ethylmethacrylamide, N,N-diethylmethacrylamide, N,N-dimethylmethacrylamide, N-phenylmethacrylamide, acrylamide, N,N-diethylacrylamide, N-ethylacrylamide, methyl 2-cyanoacrylate, methyl α-chloroacrylate, methacrolein, acrolein, methacrylonitrile, and acrylonitrile.

In certain embodiments, the hyperbranched acrylic polymer having at least one site of ethylenic unsaturation is formed by reacting the ethylenically unsaturated carboxylic acid, polyethylenically unsaturated monomer, initiator, and mono ethylenically unsaturated monomers in continuous stirred tank reactors. A solvent can also be added to the reaction mixture. Non-limiting examples of solvents that can be added to the reaction include, but are not limited to, 2-butoxy ethanol, propylene glycol monobutyl ether, 1-methoxy 2-propanol, and n-butanol. The tank reactors can be adjusted to a temperature between 100° C. and 300° C., and in certain embodiments, at a temperature between 150° C. and 220° C.

In certain embodiments, the hyperbranched acrylic polymers of the present invention exhibit an alpha parameter derived from the Mark-Houwink equation of 0.2 to 0.7, and in some embodiments, the hyperbranched acrylic polymers of the present invention exhibit an alpha parameter derived from the Mark-Houwink equation of 0.3 to 0.6.

The Mark-Houwink relationship between molar mass (M) and intrinsic viscosity ($\eta$) ([$\eta$]=K.M$\alpha$) provides information about the structure of the polymer. The alpha parameter indicates the degree of branching and can be determined by multi detection size-exclusion chromatography as described by Paillet et al, Journal of Polymer Science Part A: Polymer Chemistry, 2012, 50, 2967-2979, which is incorporated by reference herein.

The hyperbranched acrylic polymer produced in accordance with the present invention can have a weight average molecular weight between 10,000 and 200,000, such as between 15,000 and 150,000, and in certain embodiments, between 20,000 and 100,000 grams per mole. As used herein, the molecular weights are determined by gel permeation chromatography using a linear polystyrene standard. Unless otherwise indicated, molecular weights are on a weight average basis (Mw). Further, in certain embodiments, the hyperbranched acrylic polymers of the present invention are water-dispersible. As used herein, the term "water-dispersible" means that a material may be dispersed in water without the aid or use of a surfactant such as a surfactant monomer. As used herein, the term "surfactant monomers" refers to monomers that when added to water reduces the surface tension of water. As such, in certain embodiments, the hyperbranched acrylic polymers used in the practice of the invention may be substantially free, may be essentially free, and may be completely free of surfactant monomers. The term "substantially free" as used in this context means the hyperbranched acrylic polymers contain less than 1000 parts per million (ppm), "essentially free" means less than 100 ppm, and "completely free" means less than 20 parts per billion (ppb) of a surfactant monomer.

In certain embodiments, the hyperbranched acrylic polymer of the present invention is dispersed in an aqueous medium with at least one ethylenically unsaturated monomer. The ethylenically unsaturated monomers can be monoethylenically unsaturated monomers, polyethylenically unsaturated monomers, or mixtures thereof. In certain embodiments, the ethylenically unsaturated monomers are hydrophobic ethylenically unsaturated monomers. As used herein, "hydrophobic monomers" refers to monomers that do not have an affinity for water and do not to dissolve in, mix with, or swell in a water or aqueous medium. Non-limiting examples of mono ethylenically and polyethylenically unsaturated monomers used to prepare the microgels of the present invention include, but are not limited to, any of the hydrophobic mono ethylenically and polyethylenically unsaturated monomers previously discussed. For example, suitable ethylentically unsaturated monomers include, but are not limited to, methyl methacrylate, n-butyl acrylate, isobutyl acrylate, tert-butyl acrylate, and ethyleneglycol dimethacrylate.

As indicated above, the hyperbranched acrylic polymer can be prepared with an ethylenically unsaturated carboxylic acid. As such, in certain embodiments, a base is added to the aqueous medium to neutralize the acid groups. Suitable neutralizing agents include inorganic and organic bases such as sodium hydroxide, potassium hydroxide, ammonia, amines, alcohol amines having at least one primary, secondary, or tertiary amino group, and at least one hydroxyl group. Non-limiting examples of amines that can be used as the neutralizing agent include, but are not limited to, monoethanolamine, diethanolamine, N,N-dimethyl ethanolamine, diisopropanolamine, and the like.

In certain embodiments, particles are added to the aqueous medium that contains the dispersed hyperbranched acrylic polymers of the present invention. The particles can be formed from polymeric and/or non-polymeric inorganic materials, polymeric and/or non-polymeric organic materials, and composite materials, as well as mixtures of any of the foregoing. As used herein, "formed from" denotes open, e.g., "comprising" claim language. As such, it is intended that a composition or substance "formed from" a list of recited components be a composition comprising at least these recited components, and can further comprise other, non-recited components, during the composition's formation.

As used herein, the term "polymeric inorganic material" means a polymeric material having a backbone repeat unit based on an element or elements other than carbon. Moreover, as used herein, the term "polymeric organic materials" means synthetic polymeric materials, semi-synthetic polymeric materials, and natural polymeric materials, all of which have a backbone repeat unit based on carbon.

The term "organic material" as used herein, means carbon containing compounds wherein the carbon is typically bonded to itself and to hydrogen, and often to other elements as well. As used herein, the term "inorganic material" means any material that is not an organic material. As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

Particles useful in the present invention can include any inorganic materials known in the art. Suitable particles can be formed from ceramic materials, metallic materials, and mixtures of any of the foregoing. Non-limiting examples of such ceramic materials can comprise metal oxides, mixed metal oxides, metal nitrides, metal carbides, metal sulfides, metal silicates, metal borides, metal carbonates, and mixtures of any of the foregoing. A specific, non-limiting example of a metal nitride is boron nitride; a specific, non-limiting example of a metal oxide is zinc oxide; non-limiting examples of suitable mixed metal oxides are aluminum silicates and magnesium silicates; non-limiting examples of suitable metal sulfides are molybdenum disulfide, tantalum disulfide, tungsten disulfide, and zinc sulfide; non-limiting examples of metal silicates are aluminum silicates and magnesium silicates, such as vermiculite.

In certain embodiments of the present invention, the particles comprise inorganic materials selected from aluminum, barium, bismuth, boron, cadmium, calcium, cerium, cobalt, copper, iron, lanthanum, magnesium, manganese, molybdenum, nitrogen, oxygen, phosphorus, selenium, silicon, silver, sulfur, tin, titanium, tungsten, vanadium, yttrium, zinc, and zirconium, including oxides thereof, nitrides thereof, phosphides thereof, phosphates thereof, selenides thereof, sulfides thereof, sulfates thereof, and mixtures thereof. Suitable non-limiting examples of the foregoing inorganic particles include alumina, silica, titania, ceria, zirconia, bismuth oxide, magnesium oxide, iron oxide, aluminum silicate, boron carbide, nitrogen doped titania, and cadmium selenide.

The particles can comprise, for example, a core of essentially a single inorganic oxide, such as silica in colloidal, fumed, or amorphous form, alumina or colloidal alumina, titanium dioxide, iron oxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type.

Non-polymeric, inorganic materials useful in forming the particles used in the present invention can comprise inorganic materials selected from graphite, metals, oxides, carbides, nitrides, borides, sulfides, silicates, carbonates, sulfates, and hydroxides. A non-limiting example of a useful inorganic oxide is zinc oxide. Non-limiting examples of suitable inorganic sulfides include molybdenum disulfide, tantalum disulfide, tungsten disulfide, and zinc sulfide. Non-limiting examples of useful inorganic silicates include aluminum silicates and magnesium silicates, such as vermiculite. Non-limiting examples of suitable metals include molybdenum, platinum, palladium, nickel, aluminum, copper, gold, iron, silver, alloys, and mixtures of any of the foregoing.

In certain embodiments, the particles can be selected from fumed silica, amorphous silica, colloidal silica, alumina, colloidal alumina, titanium dioxide, iron oxide, cesium oxide, yttrium oxide, colloidal yttria, amorphous zirconia, colloidal zirconia, and mixtures of any of the foregoing. As disclosed above, these materials can be surface treated or untreated. Other useful particles include surface-modified silicas, such as are described in U.S. Pat. No. 5,853,809 at column 6, line 51 to column 8, line 43, incorporated herein by reference.

As another alternative, a particle can be formed from a primary material that is coated, clad, or encapsulated with one or more secondary materials to form a composite material that has a harder surface. Alternatively, a particle can be formed from a primary material that is coated, clad, or encapsulated with a differing form of the primary material to form a composite material that has a harder surface.

In certain embodiments, the particles used in the present invention have a lamellar structure. Particles having a lamellar structure are composed of sheets or plates of atoms in hexagonal array, with strong bonding within the sheet and weak van der Waals bonding between sheets, providing low shear strength between sheets. A non-limiting example of a lamellar structure is a hexagonal crystal structure. Inorganic solid particles having a lamellar fullerene (i.e., buckyball) structure are also useful in the present invention.

Non-limiting examples of suitable materials having a lamellar structure include boron nitride, graphite, metal dichalcogenides, mica, talc, gypsum, kaolinite, calcite, cadmium iodide, silver sulfide, and mixtures thereof. Suitable metal dichalcogenides include molybdenum disulfide, molybdenum diselenide, tantalum disulfide, tantalum diselenide, tungsten disulfide, tungsten diselenide, and mixtures thereof.

The particles can be formed from non-polymeric, organic materials. Non-limiting examples of non-polymeric, organic materials useful in the present invention include, but are not limited to, stearates (such as zinc stearate and aluminum stearate), diamond, carbon black, and stearamide.

The particles used in the present invention can be formed from inorganic polymeric materials. Non-limiting examples of useful inorganic polymeric materials include polyphosphazenes, polysilanes, polysiloxanes, polygermanes, polymeric sulfur, polymeric selenium, silicones, and mixtures of any of the foregoing.

The particles can be formed from synthetic, organic polymeric materials. Non-limiting examples of suitable organic polymeric materials include, but are not limited to, thermoset materials and thermoplastic materials. Non-limiting examples of suitable thermoplastic materials include thermoplastic polyesters, such as polyethylene terephthalate, polybutylene terephthalate and polyethylene naphthalate, polycarbonates, polyolefins, such as polyethylene, polypropylene and polyisobutene, acrylic polymers, such as copolymers of styrene and an acrylic acid monomer and polymers containing methacrylate, polyamides, thermoplastic polyurethanes, vinyl polymers, and mixtures of any of the foregoing.

Non-limiting examples of suitable thermoset materials include thermoset polyesters, vinyl esters, epoxy materials, phenolics, aminoplasts, thermoset polyurethanes, and mixtures of any of the foregoing.

The particles can also be hollow particles formed from materials selected from polymeric and non-polymeric inorganic materials, polymeric and non-polymeric organic materials, composite materials and mixtures of any of the foregoing. Non-limiting examples of suitable materials from which the hollow particles can be formed are described above.

In certain embodiments, the particles used in the present invention comprise an organic pigment, for example, azo compounds (Monaco, did-azo, β-Naphtha, Naphtha AS salt type azo pigment lakes, benzimidazolone, did-azo condensation, isoindolinone, isoindoline), and polycyclic (phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures of any of the foregoing. In certain embodiments, the organic material is selected from perylenes, quinacridones, phthalocyanines, isoindolines, dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, as well as substituted derivatives thereof, and mixtures thereof.

Perylene pigments used in the practice of the present invention may be unsubstituted or substituted. Substituted perylenes may be substituted at imide nitrogen atoms for example, and substituents may include an alkyl group of 1 to 10 carbon atoms, an alkoxy group of 1 to 10 carbon atoms and a halogen (such as chlorine) or combinations thereof. Substituted perylenes may contain more than one of any one substituent. The diimides and dianhydrides of perylene-3,4,9,10-tetracarboxylic acid are preferred. Crude perylenes can be prepared by methods known in the art.

Phthalocyanine pigments, especially metal phthalocyanines, may be used. Although copper phthalocyanines are more readily available, other metal-containing phthalocyanine pigments, such as those based on zinc, cobalt, iron, nickel, and other such metals, may also be used. Metal-free phthalocyanines are also suitable. Phthalocyanine pigments may be unsubstituted or partially substituted, for example, with one or more alkyl (having 1 to 10 carbon atoms), alkoxy (having 1 to 10 carbon atoms), halogens such as chlorine, or other substituents typical of phthalocyanine pigments. Phthalocyanines may be prepared by any of several methods known in the art. They are typically prepared by a reaction of phthalic anhydride, phthalonitrile, or derivatives thereof, with a metal donor, a nitrogen donor (such as urea or the phthalonitrile itself), and an optional catalyst, preferably in an organic solvent.

Quinacridone pigments, as used herein, include unsubstituted or substituted quinacridones (for example, with one or more alkyl, alkoxy, halogens such as chlorine, or other substituents typical of quinacridone pigments), and are suitable for the practice of the present invention. The quinacridone pigments may be prepared by any of several methods known in the art but are preferably prepared by thermally ring-closing various 2,5-dianilinoterephthalic acid precursors in the presence of polyphosphoric acid.

Isoindoline pigments, which can optionally be substituted symmetrically or unsymmetrically, are also suitable for the practice of the present invention and can be prepared by methods known in the art. A suitable isoindoline pigment, Pigment Yellow 139, is a symmetrical adduct of iminoisoindoline and barbituric acid precursors. Dioxazine pigments (that is, triphenedioxazines) are also suitable organic pigments and can be prepared by methods known in the art.

Mixtures of any of the previously described inorganic particles and/or organic particles can also be used. Also, if desired, the particles described above can be formed into nanoparticles. Methods of preparing nanoparticles are described in U.S. Pat. No. 7,605,194, which is incorporated by reference herein.

In certain embodiments, the aqueous dispersion comprising particles at least partially encapsulated in a microgel are formed by: (1) mixing in an aqueous medium (a) the hyperbranched acrylic polymer, (b) at least one ethylenically unsaturated monomer, and (c) particles; and (2) polymerizing the mixture. Various polymerization techniques well known in the art can be used. For example, in certain embodiments, the mixture can be subjected to free radical polymerization. In these embodiments, a free radical polymerization initiator may be used. Both water and oil soluble initiators can be used including, but not limited to, hydrogen peroxide, t-butyl hydroperoxide, di-t-butyl peroxide, benzoyl peroxide, and di-t-amyl peroxide, butylperoxy-2-ethyl hexanoate, t-butyl peracetate, and 2,2'azobis (2 methylbutyronitrile).

Polymerizing the hyperbranched acrylic polymer and ethylenically unsaturated monomer produces an aqueous dispersion of particles at least partially encapsulated in a microgel. In certain embodiments, the microgel encapsulated particles are present in the aqueous dispersions in an amount of 2 to 90 weight percent, such as in an amount of 20 to 70 weight percent, and in certain embodiments in an amount of 40 to 60 weight percent, with weight percents being based on weight of total solids present in the dispersion.

In certain embodiments, the hyperbranched acrylic polymer, at least one ethylenically unsaturated monomer, and particles are mixed together in an aqueous medium and subjected to a milling or grinding process prior to polymerization. Any standard grinding technique known in the art can be employed. Such methods are described in detail in United States Patent Application Publication No. 2005/0287348 at paragraphs [0036] to [0050], the cited portion of which is being incorporated herein by reference.

The microgel encapsulated particles produced by the methods of the present invention create a phase barrier that physically prevents the particles from re-agglomerating within the aqueous dispersion. In addition, the resulting aqueous dispersion comprising particles at least partially encapsulated in a microgel exhibit improved rheology, such as low shear viscosity, and do not require a rheology modifier or require a lower amount of rheology modifier. As used herein, the term "rheology" refers to the deformation and flow properties of fluids and liquids to include shear-strain relationships and viscosity. Particular rheological characteristics include, but are not limited to, the shear response of a fluid or liquid, viscoelasticity, pseudoplasticity, thixotropy, and hysteresis properties as a result of stress, strain and shear history applied to the fluid or liquid.

In certain embodiments, the aqueous dispersion is used to form various types of coatings including, but not limited to, a basecoat. Due to the properties of the aqueous dispersion of the present invention, coatings formed from the aqueous dispersion of the present invention exhibit improved rheological properties. For instance, it was found that a basecoat prepared from the aqueous dispersion of the present invention had a higher low shear viscosity than a basecoat made from a linear (non-branched) acrylic polymer. Higher low shear viscosity prevents pigment in a coating from settling during prolonged storage and prevents a coating from sagging after it has been applied to a vertical surface.

The following examples are presented to demonstrate the general principles of the invention. The invention should not be considered as limited to the specific examples presented. All parts and percentages in the examples are by weight unless otherwise indicated.

EXAMPLE 1

Hyperbranched Acrylic Polymer Preparation

A hyperbranched acrylic polymer according to the present invention was prepared from the following mixture of ingredients as described below:

TABLE 1

| Ingredients | Parts by Weight (grams) |
|---|---|
| Charge I | |
| butyl acrylate | 4276.2 |
| butyl methacrylate | 1922.8 |
| hydroxyethyl acrylate | 898.2 |
| α-methylstyrene | 898.6 |
| acrylic acid | 628.9 |
| 1,6-hexanediol diacrylate | 359.6 |
| di-t-amyl peroxide | 269.5 |
| ethylene glycol monobutyl ether | 1796.6 |
| Charge II | |
| di-t-amyl peroxide | 87.7 |

A 300 cm$^3$ electrically heated continuous stirred tank reactor with an internal cooling coil was filled with ethylene glycol monobutyl ether and the temperature was adjusted to 200° C. Charge I from Table 1 above was fed to the reactor from a feed tank at 100 cm$^3$/minute, resulting in a residence time of three minutes. The reactor was kept volumetrically full at a pressure of 400-600 psi. The temperature was held constant at 200° C. The reactor output was drained to a waste vessel for the first nine minutes and was then diverted to a 3000 cm$^3$ continuous stirred tank reactor fitted with a pressure relief valve set to vent at 35 psi. At this point, Charge II was fed to the second reactor at a rate of 0.95 cm$^3$/minute. The contents of the second reactor were maintained at 170° C. When 1500 cm$^3$ had been added to the second reactor, the outlet valve was opened and the resin was fed to a collection vessel at a rate that maintained a constant fill level, resulting in a 15 minute residence time.

The resulting hyperbranched acrylic polymer had a solids content of 82.2%, a Gardner-Holt viscosity of Z6+, weight average molecular weight of 20,977 grams per mole, and a number average molecular weight of 2,865. The molecular weights were determined by gel permeation chromatography calibrated using linear polystyrene standards.

EXAMPLE 2

Hyperbranched Acrylic Dispersion Preparation

A hyperbranched acrylic polymer aqueous dispersion according to the present invention was prepared from the following mixture of ingredients as described below:

TABLE 2

| Ingredients | Parts by Weight (grams) |
|---|---|
| Charge I | |
| Hyperbranched acrylic polymer of Example 1 | 1237.5 |
| Ethyleneglycol dimethacrylate | 110.8 |
| 2,6-ditert-butyl-4-methylphenol | 0.2 |
| N,N-Dimethyl ethanolamine | 59.9 |
| Deionized water | 2591.7 |

The hyperbranched acrylic polymer of Example 1 was added to a 4-Liter stainless steel beaker. Ethyleneglycol dimethacrylate, 2,6-ditert-butyl-4-methylphenol, and N,N-dimethanolamine were added, in order, under high agitation using a 3-inch stainless steel impeller with high lift pitch. The deionized water was added slowly while maintaining stirring with high shear. The resulting dispersion was 28.8% solids, measured after 1 hour at 110° C. The dispersion had a pH of 7.9 and a viscosity of 150 centipoise as measured with a #2 spindle on a Brookfield viscometer at 25° C.

EXAMPLE 3

Microgel/Pigment Dispersion Preparation

An aqueous dispersion with pigment particles encapsulated in a microgel according to the present invention was prepared from the following mixture of ingredients as described below:

TABLE 3

| Ingredients | Parts by Weight (grams) |
|---|---|
| Charge I | |
| Hyperbranched acrylic dispersion of Example 2 | 635.44 |
| Demineralized water | 150.00 |
| Kroma Red Pigment[1] | 260.87 |
| Charge II | |
| 50% N,N-dimethyl ethanolamine in demineralized water | 50.0 |
| Demineralized water | 260.87 |
| Solution A | |
| Demineralized Water | 2.799 |
| 70% t-butyl hydroperoxide | 0.494 |
| Solution B | |
| Demineralized Water | 52.59 |
| Sodium metabisulfite | 0.76 |
| Ferrous ammonium sulfate | 0.010 |
| N,N-Dimethyl ethanolamine | 0.570 |

[1]Commercially available from Rockwood.

The hyperbranched acrylic dispersion of Example 2 and the deionized water from Charge I were mixed in a stainless steel container with a Cowles mixing impeller. The Kroma Red pigment was slowly added to the container to allow homogeneous incorporation, and the mixture was stirred for 30 minutes. After the addition of Charge II, this predispersion was then milled in a Hockmeyer basket mill with 0.9-1.2 mm ZIRCONOX® media (available from Jyoti Ceramic Industries) at 2200 rpm until the dispersion measured less than 7 based on the Hegman scale. Solution A was added drop wise at 25° C. and the mixture was allowed to stir for 5 minutes under a Nitrogen blanket. Solution B was then fed into the dispersion over a course of 5 minutes while stirring under nitrogen. The final mixture was stirred for 10 minutes and the final temperature was 25° C. A pigment dispersion with 39.7% solids (measured after 1 hour at 110° C.) and a pigment to binder ratio of 1.2 resulted.

EXAMPLE 4

Basecoat Prepared from Microgel/Pigment Dispersion

A basecoat according to the present invention was prepared from the following mixture of ingredients as described below:

TABLE 4

| No. | | Parts by Weight (grams) |
|---|---|---|
| | Aqueous Phase Ingredients | |
| 1 | Demineralized water | 12.5 |
| 2 | 50% N,N-dimethyl ethanolamine | 0.2 |
| 3 | Polyester A[1] | 5.7 |
| 4 | Polyester B[2] | 1.3 |
| 5 | Byk 345[3] | 0.1 |
| 6 | Byk 032[4] | 0.5 |
| 7 | Mineral Spirits[5] | 0.8 |
| 8 | Latex A[6] | 20.4 |
| 9 | Latex B[7] | 15.7 |
| 10 | Pigment dispersion of Example 3 | 13.3 |
| 11 | Demineralized water | 9.2 |
| | Organic Phase Ingredients | |
| 12 | Urethane diol[8] | 2.5 |
| 13 | Resimene HM2608[9] | 3.5 |
| 14 | Cymel 1158[10] | 2.0 |
| 15 | Ethylene glycol monobutyl ether | 1.2 |
| 16 | Microtalc[11] | 1.5 |
| 17 | Propylene glycol monobutyl ether | 4.1 |
| 18 | 2-Ethylhexanol | 4.0 |

[1]Polyester A is made with 73 parts of Empol 1008, 2.6 parts of trimellitic anhydride, 5.2 parts of dimethylol propionic acid, 19.1 parts of 1,4 cyclohexane dimethanol, with a Mw of 24,160 as measured by HPLC in solvent against a linear polystyrene standard, and an acid value of 15.5.
[2]Polyester B is made with 39.2 parts of isostearic acid, 23.8 parts of 1,4 cyclohexane dicarboxylic acid, 37 parts of trimethylol propane, with a molecular weight of 726, and an acid value of 2.
[3]Commercially available from BYK.
[4]Commercially available from BYK.
[5]Commercially available from Shell Chemical.
[6]Latex A is made with 4.1 parts dimethyl ethanolamine, 3.9 parts hexanediol diacrylate, 9.7 parts 2-ethyl hexyl acrylate, 24.9 parts methyl methacrylate, 5.9 parts dimethylol propionic acid, 5.8 parts hydroxyl ethyl methacrylate, 29.5 parts polytetramethylene ether glycol (MW = 1000), 16.4 parts isophorone diisocyanate, with solids of 37.8% in water.
[7]Latex B is made with 8.8 parts of 50% acrylamide, 63 parts of n-butyl methacrylate, 25.6 parts of 1,6 hexanediol diacrylate, 1.7 parts methyl methacrylate, 0.9 parts n-butyl acrylate, with solids of 25.0% in water.
[8]Urethane diol is made with 70.1 parts of polyoxypropylene diamine (molecular weight = 400) and 29.9 parts of ethylene carbonate, with a molecular weight of 750.
[9]Commercially available from Cytec Industries.
[10]Commercially available from Cytec Industries.
[11]Commercially available from Barretts Minerals.

Materials 1-9 of the aqueous phase in Table 4 were mixed under stirring. The pigment dispersion of Example 3 (No. 10) was then added to the aqueous mixture. Materials 12-18 of the organic phase in Table 4 were mixed under stirring for 15 minutes prior to being added into the aqueous phase mixture. After mixing the aqueous and organic phase ingredients, the pH was adjusted to 8.5 using 50% dimethylethanolamine. The resulting basecoat was aged for 24 hours prior to viscosity adjustment with demineralized water (No. 11). The high shear viscosity of the basecoat was adjusted to 75 cps at 1000 sec$^{-1}$ shear rate using Brookfield Caps 2000 viscometer with spindle #1.

COMPARATIVE EXAMPLE 1

Comparative Pigment Dispersion

A pigment dispersion was prepared from the following mixture of ingredients as described below:

TABLE 5

| Ingredients | Parts by Weight (grams) |
|---|---|
| Charge I | |
| Linear acrylic grind resin[1] | 61.38 |
| Propylene glycol monomethyl ether | 3.53 |

TABLE 5-continued

| Ingredients | Parts by Weight (grams) |
|---|---|
| Demineralized water | 3.70 |
| Kroma Red Pigment[2] | 24.99 |
| Charge II | |
| 50% N,N-dimethyl ethanolamine in demineralized water | 0.82 |

[1]Linear acrylic grind resin is made with 8.5 parts of hydroxyethyl acrylate, 18.0 parts of n-butyl methacrylate, 30.0 parts of styrene, 35.0 parts of n-butyl acrylate, and 8.5 parts of acrylic acid, with a Mw of 85,000 as measured by HPLC in (solvent) against a linear polystyrene standard, an acid value of 66.3, 52% neutralized with dimethylethanolamine, with a solids content of 27.0% in a 5:1 mixture of water and diethylene glycol monobutyl ether.
[2]Commercially available from Rockwood.

A high molecular acrylic grind resin, propylene glycol monomethyl ether, and demineralized water of Charge I were mixed according to Table 5, using a Cowles mixing impeller. The Kroma Red pigment was slowly added into the container while stirring and the pH of the mixture was adjusted to 8.3 with Charge II. This predispersion was milled in a Drais mill with 1.0 mm TZP grinding media until the dispersion measured less than 7 on the Hegman scale. The finished dispersion was collected. This process resulted in 46.5% solids of pigment dispersion and 1.2 pigment to binder ratio.

COMPARATIVE EXAMPLE 2

Comparative Basecoat Preparation

A basecoat was prepared from the following mixture of ingredients as described below:

TABLE 6

| No. | | Parts by Weight (grams) |
|---|---|---|
| | Aqueous Phase Ingredients | |
| 1 | Demineralized water | 12.2 |
| 2 | 50% N,N-dimethyl ethanolamine | 0.2 |
| 3 | Polyester A[1] | 5.6 |
| 4 | Polyester B[2] | 1.3 |
| 5 | Byk 345[3] | 0.1 |
| 6 | Byk 032[4] | 0.5 |
| 7 | Mineral Spirits[5] | 0.8 |
| 8 | Latex A[6] | 19.6 |
| 9 | Latex B[7] | 15.3 |
| 10 | Pigment dispersion of Comparative Example 1 | 11.2 |
| 11 | Demineralized water | 8.9 |
| | Organic Phase Ingredients | |
| 12 | Urethane diol[8] | 2.4 |
| 13 | Resimene HM2608[9] | 3.4 |
| 14 | Cymel 1158[10] | 2.0 |
| 15 | Ethylene glycol monobutyl ether | 1.2 |
| 16 | Microtalc[11] | 1.5 |
| 17 | Propylene glycol monobutyl ether | 4.0 |
| 18 | 2-Ethylhexanol | 3.8 |

[1]Polyester A is made with 73 parts of Empol 1008, 2.6 parts of trimellitic anhydride, 5.2 parts of dimethylol propionic acid, 19.1 parts of 1,4 cyclohexane dimethanol, with a Mw of 24,160 as measured by HPLC in (solvent) against a linear polystyrene standard, and an acid value of 15.5.
[2]Polyester B is made with 39.2 parts of isostearic acid, 23.8 parts of 1,4 cyclohexane dicarboxylic acid, 37 parts of trimethylol propane, with a molecular weight of 726, and an acid value of 2.
[3]Commercially available from BYK.
[4]Commercially available from BYK.
[5]Commercially available from Shell Chemical.
[6]Latex A is made with 4.1 parts dimethyl ethanolamine, 3.9 parts hexanediol diacrylate, 9.7 parts 2-ethyl hexyl acrylate, 24.9 parts methyl methacrylate, 5.9 parts dimethylol propionic acid, 5.8 parts hydroxyl ethyl methacrylate, 29.5 parts polytetramethylene ether glycol (MW = 1000), 16.4 parts isophorone diisocyanate, with solids of 37.8% in water.

TABLE 6-continued

| No. | | Parts by Weight (grams) |
|---|---|---|

[7]Latex B is made with 8.8 parts of 50% acrylamide, 63 parts of n-butyl methacrylate, 25.6 parts of 1,6 hexanediol diacrylate, 1.7 parts methyl methacrylate, 0.9 parts n-butyl acrylate, with solids of 25.0% in water.
[8]Urethane diol is made with 70.1 parts of polyoxypropylene diamine (molecular weight = 400) and 29.9 parts of ethylene carbonate, with a molecular weight of 750.
[9]Commercially available from Cytec Industries.
[10]Commercially available from Cytec Industries.
[11]Commercially available from Barretts Minerals.

The first 9 materials of the aqueous phase in Table 6 were mixed under stirring. The pigment dispersion of Comparative Example 1 (No. 10) was then added to the aqueous mixture. Materials 12-18 of the organic phase in Table 6 were mixed under stirring for 15 minutes prior to being added into the aqueous phase mixture. After mixing the aqueous and organic phase ingredients, the pH was adjusted to 8.5 using 50% dimethylethanolamine. The resulting basecoat was aged for 24 hours prior to viscosity adjustment with demineralized water (No. 11). The high shear viscosity of the basecoat was adjusted to 75 cps at 1000 sec$^{-1}$ shear rate using Brookfield Caps 2000 viscometer with spindle #1.

The rheology profile of Example 4 and Comparative Example 2 were measured using Anton Paar Cone and Plate (CP 50) viscometer. The viscosity data of Example 4 and Comparative Example 2 is listed in Table 7 below. As shown in Table 7, the basecoat according to Example 4 exhibited a higher low shear viscosity than the basecoat prepared according to Comparative Example 2.

TABLE 7

| Properties | Example 4 | Comparative Example 2 |
|---|---|---|
| % solids (1 hour, 110° C.) | 30.8 | 31.4 |
| High shear viscosity (cps) | 72.1 | 87.6 |
| Low shear viscosity (cps) | 56,770 | 9,400 |
| Pigment to Binder ratio | 0.17 | 0.17 |

While the preferred embodiments of the present invention are described above, obvious modifications and alterations of the present invention may be made without departing from the spirit and scope of the present invention. The scope of the present invention is defined in the appended claims and equivalents thereto.

The invention claimed is:

1. An aqueous dispersion comprising particles at least partially encapsulated in a microgel, wherein the microgel is formed from a hyperbranched acrylic polymer.

2. The aqueous dispersion of claim 1, wherein the particles comprise inorganic particles.

3. The aqueous dispersion of claim 2, wherein the inorganic particles comprise titanium dioxide, alumina, silica, and/or iron oxide.

4. The aqueous dispersion of claim 1, wherein the particles comprise organic particles.

5. The aqueous dispersion of claim 4, wherein the organic particles comprise organic pigments comprising perylenes, phthalocyanines, isoindolines, quinacridones, and/or indanthrones.

6. The aqueous dispersion of claim 1, wherein the particles comprise nanoparticles.

7. The aqueous dispersion of claim 1, wherein the microgel is prepared from a reaction mixture comprising:
   (i) a hyperbranched acrylic polymer having ethylenic unsaturation; and
   (ii) an ethylenically unsaturated monomer.

8. The aqueous dispersion of claim 7, wherein the hyperbranched acrylic polymer having ethylenic unsaturation is prepared from reactants comprising:
   (i) an ethylenically unsaturated carboxylic acid; and
   (ii) a monomer with more than one ethylenic unsaturation.

9. The aqueous dispersion of claim 7, wherein the hyperbranched acrylic polymer having ethylenic unsaturation is water-dispersible.

10. The aqueous dispersion of claim 7, wherein the hyperbranched acrylic polymer having ethylenic unsaturation has a weight average molecular weight of 20,000 to 100,000 grams per mole.

11. The aqueous dispersion of claim 7, wherein the hyperbranched acrylic polymer having ethylenic unsaturation exhibits an alpha parameter derived from the Mark-Houwink equation of 0.2 to 0.7.

12. The aqueous dispersion of claim 11, wherein the hyperbranched acrylic polymer having ethylenic unsaturation exhibits an alpha parameter derived from the Mark-Houwink equation of 0.3 to 0.6.

13. The aqueous dispersion of claim 1, wherein the aqueous dispersion is substantially free of surfactant monomers.

14. The aqueous dispersion of claim 1, wherein the aqueous dispersion is completely free of surfactant monomers.

15. A coating comprising an aqueous dispersion according to claim 1.

16. A method for making an aqueous dispersion of claim 1 comprising:
   (1) mixing in an aqueous medium:
      (a) particles,
      (b) at least one ethylenically unsaturated monomer, and
      (c) a water-dispersible hyperbranched acrylic polymer having ethylenic unsaturation; and
   (2) polymerizing the at least one ethylenically unsaturated monomer and water-dispersible hyperbranched acrylic polymer having ethylenic unsaturation to at least partially encapsulate the particles in a microgel.

17. The method of claim 16, wherein the water-dispersible hyperbranched acrylic polymer having ethylenic unsaturation has a weight average molecular weight of 20,000 to 100,000 grams per mole.

18. The method of claim 16, wherein the water-dispersible hyperbranched acrylic polymer having ethylenic unsaturation exhibits an alpha parameter derived from the Mark-Houwink equation of 0.2 to 0.7.

19. The method of claim 16, wherein the particles comprise inorganic particles.

20. The method of claim 19, wherein the inorganic particles comprise titanium dioxide, alumina, silica, and/or iron oxide.

* * * * *